Patented Sept. 7, 1948

2,448,828

UNITED STATES PATENT OFFICE 2,448,828

PHOTOPOLYMERIZATION

Malcolm M. Renfrew, Arlington, N. J., assignor to E. I. du Pont de Nemours & Company, Wilmington, Del., a corporation of Delaware No Drawing. Application September 4, 1946, Serial No. 694,836

9 Claims. (Cl. 204—162)

This invention relates to the polymerization of ethylenically unsaturated organic compounds in the presence of light and more particularly to the photopolymerization of said compounds with the aid of a light-activated catalyst.

While the polymerization of ethylenically unsaturated organic compounds by the catalytic action of light or by the catalytic action of light in the presence of a light-activated catalyst such as an acyloin compound is known in the art, these methods have been unable to complete entirely satisfactorily with present commercial methods of polymerization. This is probably due in part to the fact that even the most advanced conventional methods of photopolymerization proceed at an undesirably slow rate of polymerization.

An object of this invention is to provide an improved process of photopolymerizing ethylenically unsaturated organic compounds. A further object is to provide a novel process of photopolymerizing said compounds in the presence of a light-activated catalyst therefor. A still further object is to provide such a process whereby the time required to produce substantial polymerization is materially decreased without sacrifice in the high quality of the resulting product. Other objects will appear from the description of this invention given hereinafter.

The above objects are accomplished according to the present invention which comprises irradiating, with light having a wave length of 1800–7000 angstroms, a composition comprising a photopolymerizable ethylenically unsaturated organic compound and, as a photopolymerization catalyst therefor, an acyloin ether of the formula

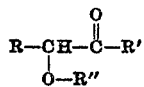

wherein R, R' and R'' are monovalent hydrocarbon radicals. More specifically it is preferred to employ 0.01%–1.0%, by weight of the monomeric material used, of the photopolymerization, i. e. light-activated, catalyst; 0.05%–0.2% of the catalyst is specifically preferred.

The polymerization can be carried out by any of the conventional processes, such as bulk, emulsion, granular and solution polymerization processes. In all these processes the time required for substantial photopolymerization of samples containing acyloin ether catalysts is materially less than the time required for those samples containing acyloin catalysts; this difference is shown by the following examples, wherein parts are by weight unless otherwise indicated, illustrating specific embodiments of the instant invention. The reaction vessels are of glass unless otherwise noted. In all examples, except Example III, in which summer sunlight was used, a mercury vapor arc lamp encased in a quartz envelope was used at a distance of about 4–12 inches from the photopolymerizable material. Light having wave lengths within the range of 1800–7000 angstroms were employed.

Example I

Into each of two reaction vessels was poured a mixture containing 10 parts of the dimethacrylate esters of a mixture of ethylene glycols and 0.01 part of lauroyl peroxide catalyst. To one vessel was added 0.01 part of benzoin and to the other was added 0.01 part of benzoin ethyl ether. Iron-constantan thermocouples were placed in each monomeric solution to record temperature changes during the course of the reaction. Both vessels were exposed to radiation from an ultraviolet lamp. The rate of polymerization of the acyloin-catalyzed monomer was compared with that of the acyloin ether catalyzed monomer by recording the temperatures of the two reactions at corresponding time intervals, as tabulated below.

| Time, minutes | Temperature, °C., with— | |
|---|---|---|
| | Benzoin | Benzoin ethyl ether |
| 0 | 25 | 25 |
| 1 | 26.9 | 26.9 |
| 2 | 26.9 | 26.9 |
| 3 | 28.9 | 36.3 |
| 3.5 | 28.9 | 43.6 |
| 3.75 | 29.8 | 50.8 |
| 4 | 30.7 | 63.4 |
| 4.25 | 30.7 | 79.6 |
| 4.5 | 30.7 | 129.6 |
| 4.75 | 30.7 | 165 |
| 5 | 30.7 | 167 |
| 6 | 34.4 | 161 |
| 8 | 43.6 | |
| 10 | 52.6 | |
| 12 | 167 | |
| 13 | 161 | |

From this tabulation it will be readily seen that the polymerization catalyzed with benzoin ethyl ether and lauroyl peroxide was completed in five minutes, whereas the same reaction catalyzed with benzoin and lauroyl peroxide required twelve minutes.

Example II

Ten parts of methyl methacrylate monomer and 0.01 part of lauroyl peroxide were mixed in each of two glass vessels. To one vessel was added 0.1 part pivaloin and to the other 0.1 part of pivaloin ethyl ether. Both samples were then irradiated with a mercury vapor arc ultravoilet lamp. In ten minutes the solution containing the pivaloin ethyl ether had thickened to a viscous gel, while there was very little change apparent in the monomer containing pivaloin.

Example III

A mixture of 100 parts of methyl methacrylate monomer and 0.01 part of 3% lauroyl peroxide solution was made up in two reaction vessels. To one vessel was added 0.1 part benzoin and to the other 0.1 part benzoin ethyl ether. The bottles were swept out with nitrogen gas, sealed and exposed to summer sunlight. After 135 minutes under these conditions, the monomer containing the benzoin ethyl ether was thick and viscous, while the monomer containing the benzoin was still thin. The castings obtained at the end of the polymerization were hard, bubblefree, substantially colorless resins.

Example IV

One hundred parts styrene, 0.5 part benzoyl peroxide and 0.5 part benzoin propyl ether were exposed in a glass dish to a mercury vapor arc ultraviolet lamp for 60 minutes. At the end of this time polymerization was complete, yielding a hard and clear polystyrene casting. A similar experiment with benzoin required 150 minutes to complete the polymerization.

Example V

One hundred parts of monomeric methyl methacrylate containing 0.05% of lauroyl peroxide catalyst, 0.05% benzoin ethyl ether, and 0.05% of yellow dye (Ref. Color Index No. 17, 1945 edition American Association Textile Chemists and Colorists Handbook) were exposed at room temperature in a reaction vessel to irradiation from a mercury vapor arc lamp. In 35 minutes the methyl methacrylate had polymerized to yield a hard and clear yellow casting of excellent color.

Photopolymerization catalysts within the scope of the present invention include acyloin ethers having the formula

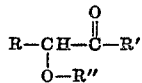

wherein R, R' and R'' are monovalent hydrocarbon radicals. Examples of such ethers are benzoin methyl ether, benzoin ethyl ether, benzoin propyl ether, pivaloin ethyl ether and anisoin methyl ether. The preferred acyloin ethers are those of benzoin, benzoin ethyl ether being specifically preferred. A method of preparing acyloin ethers is shown by Whitmore—Organic Chemistry, page 405. Fisher prepared ethyl and methyl ethers of benzoin—Berichte, 26, 2412 (1893). Irvine and Moodie prepared anisoin methyl ether—Journal Chemical Society, 91, 543 (1907).

The concentration of catalysts in the photopolymerizable composition is important because it effects the rate of polymerization. The catalyst concentrations referred to herein are by weight of the monomeric materials present. While concentrations of catalysts of 0.01%–1.0% are suitable for carrying out this invention, concentrations of 0.05%–0.2% are preferred. Usually about 0.1% will be employed, although more or less can be employed depending on the nature of the product being prepared and on the rate of polymerization desired. As will be appreciated by those skilled in the art, excessive amounts of catalysts can be as undesirable as insufficient amounts. Thus, if the quantity of catalysts is too small the reaction proceeds too slowly, whereas if the quantity is too great discoloration is apt to occur. In most systems of polymerization it is generally desirable, but not essential, to use a peroxide catalyst with the acyloin ether. Suitable peroxides are those conventionally used in polymerization reactions, e. g. benzoyl peroxide, lauroyl peroxide, hydrogen peroxide and the like. These peroxides may be used in concentrations normally used in polymerization reactions.

The polymerizable materials useful in carrying out the instant invention are those compounds having at least one ethylenic double bond and which polymerize under the influence of light at least in the presence of another polymerizable ethylenically unsaturated compound, i. e. either alone or together with said other polymerizable compound or compounds. Such photopolymerizable ethylenically unsaturated organic compounds include certain acrylic, methacrylic, and chloroacrylic acid compounds, e. g. esters, amides and nitriles, examples of specific applicable compounds of which are acrolein, acrylonitrile, ethyl acrylate, methacrylamide and methyl chloroacrylate; vinyl and vinylidene compounds, e. g. esters, ethers and ketones, examples of specific applicable compounds of which are vinyl acetate, vinyl chloride, vinylidene chloride, divinyl formal and methyl vinyl ketone; and hydrocarbons, e. g. styrene, isoprene and chloroprene. Thus, this invention comprises not only the polymerization of the single readily polymerizable ethylenically unsaturated organic compounds, but includes also the simultaneous polymerization of two or more of these materials. Unsaturated materials which fail to polymerize under the action of light either alone or in the presence of other polymerizable unsaturated compounds are excluded from this invention.

The term light as used herein includes wave lengths both in the infrared and in the ultraviolet and, of course, wave lengths of all light in the intermediate visible spectrum; however, the rate of photopolymerization is slower in the infrared than in the ultraviolet light. Although the preferred light is that having wave lengths of 3200–7000 angstroms, light having wave lengths of 1800–7000 angstroms is applicable. Light having a wave length of 7000 angstroms represents the beginning of the infrared band having the less effective wave lengths. It will be appreciated that the wave lengths of light actually employed often depend somewhat on the nature of the radiating medium and the material of which the reaction vessel is fabricated. Of course, the radiation will be of sufficient intensity and will be employed for a time sufficient to produce substantial polymerization.

An outstanding advantage of this invention is that it appreciably lessens the time conventionally required for substantial polymerization of the materials disclosed herein without sacrificing the quality of products produced, thereby making the manufacture of such products much more economical. The desirability of a rapidly-setting monomeric mixture in the cementing of transparent materials or the elimination of imperfections therein, such as cracks, bubbles, depressions, surface scratches and the like, will be appreciated by those skilled in the art.

In addition to its value, generally, in manufacturing polymers, the present invention has a number of other very useful applications including adhering the surfaces of two objects, at least one of which is transparent, by placing a small amount of a mixture of monomer and acyloin ether between the surfaces and passing light of appropriate intensity through the transparent member. Further, the invention is applicable to the preparation of a number of plastic articles, e. g. optical pieces, provided a satisfactory negative mold can be prepared if required, in which one or more of the surfaces is composed of a material transparent to ultraviolet light.

This invention is also highly desirable for eliminating imperfections caused by fissures and bubbles in those transparent polymeric materials which are capable of being prepared by the process disclosed herein. For example, imperfections of this kind in polymerized methyl methacrylate can be eliminated by filling fissures or bubbles with a partially polymerized methyl methacrylate in the form of a syrup containing an acyloin ether and a peroxide catalyst and subjecting the filled portions to the light of a mercury vapor lamp.

As many apparently widely different embodiments of this invention may be made without departing from the spirit and scope thereof, it is to be understood that the invention is not limited to the specific embodiments thereof except as defined in the appended claims.

I claim:

1. Process of preparing polymers comprising irradiating, with light having a wave length of 1800–7000 angstroms, a photopolymerizable ethylenically unsaturated organic compound containing 0.01%–1.0%, by weight thereof, as a photopolymerizable catalyst therefor, of an acyloin ether of the formula

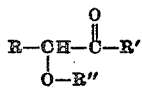

wherein R, R' and R'' are monovalent hydrocarbon radicals.

2. Process of preparing polymers comprising irradiating, with light having a wave length of 1800–1700 angstroms, monomeric methyl methacrylate containing 0.01%–1.0%, by weight thereof, as a photopolymerizable catalyst therefor, of an acyloin ether of the formula

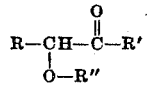

wherein R, R' and R'' are monovalent hydrocarbon radicals.

3. Process of preparing polymers comprising irradiating, with light having a wave length of 1800–1700 angstroms, monomeric methyl methacrylate containing 0.01%–1.0%, by weight thereof, of benzoin ethyl ether.

4. Process of preparing polymers comprising irradiating, with light having a wave length of 1800–1700 angstroms, monomeric methyl methacrylate containing 0.01%–1.0%, by weight thereof, of pivaloin ethyl ether.

5. Process of preparing polymers comprising irradiating, with light having a wave length of 1800–1700 angstroms, monomeric methyl methacrylate containing 0.01%–1.0%, by weight thereof, of benzoin ethyl ether, and a peroxide.

6. Process of preparing polymers comprising irradiating, with light having a wave length of 1800 to 7000 angstroms, a photopolymerizable ethylenically unsaturated organic compound containing 0.01%–1.0%, by weight thereof, as a photopolymerization catalyst therefor, of benzoin ethyl ether.

7. Process of preparing polymers comprising irradiating, with light having a wave length of 1800 to 7000 angstroms, a photopolymerizable ethylenically unsaturated organic compound containing 0.01%–1.0%, by weight thereof, as a photopolymerization catalyst therefor, of pivaloin ethyl ether.

8. Process of preparing polymers comprising irradiating, with light having a wave length of 1800 to 7000 angstroms, a photopolymerizable ethylenically unsaturated organic compound containing 0.01%–1.0%, by weight, thereof, as a photopolymerization catalyst therefor, of benzoin propyl ether.

9. Process of preparing polymers comprising irradiating, with light having a wave length of 1800 to 7000 angstroms, monomeric methyl methacrylate containing 0.01%–1.0%, by weight thereof, of benzoin propyl ether.

MALCOLM M. RENFREW.

REFERENCES CITED

The following references are of record in the file of this patent:

UNITED STATES PATENTS

| Number | Name | Date |
| --- | --- | --- |
| 2,335,133 | Renfrew | Nov. 23, 1943 |
| 2,367,661 | Agre | Jan. 23, 1945 |
| 2,367,670 | Christ | Jan. 23, 1945 |

Certificate of Correction

Patent No. 2,448,828.  September 7, 1948.

MALCOLM M. RENFREW

It is hereby certified that errors appear in the printed specification of the above numbered patent requiring correction as follows: Column 1, line 11, for the word "complete" read *compete*; column 5, line 59, and column 6, lines 11, 16, and 21, for "1800–1700 angstroms" read *1800–7000 angstroms*; and that the said Letters Patent should be read with these corrections therein that the same may conform to the record of the case in the Patent Office.

Signed and sealed this 16th day of November, A. D. 1948.

[SEAL]

THOMAS F. MURPHY,
*Assistant Commissioner of Patents.*